(12) United States Patent
Lee et al.

(10) Patent No.: US 11,070,617 B2
(45) Date of Patent: Jul. 20, 2021

(54) PREDICTING CLOUD ENABLEMENT FROM STORAGE AND DATA METRICS HARNESSED FROM ACROSS STACK

(71) Applicant: International Business Machines Corporation, Armonk, NY (US)

(72) Inventors: Sunhwan Lee, Menlo Park, CA (US); Sushama Karumanchi, State College, PA (US); Mu Qiao, Belmont, CA (US); Ramani R. Routray, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1425 days.

(21) Appl. No.: 14/923,112

(22) Filed: Oct. 26, 2015

(65) Prior Publication Data
US 2017/0118282 A1   Apr. 27, 2017

(51) Int. Cl.
*H04L 29/08* (2006.01)
*H04L 12/26* (2006.01)

(52) U.S. Cl.
CPC .......... *H04L 67/1097* (2013.01); *H04L 43/08* (2013.01); *H04L 67/322* (2013.01)

(58) Field of Classification Search
CPC .................................................. H04L 67/148
See application file for complete search history.

(56) References Cited

U.S. PATENT DOCUMENTS

| | | | | |
|---|---|---|---|---|
| 5,313,631 A | * | 5/1994 | Kao | G06F 12/122 |
| 8,561,127 B1 | * | 10/2013 | Agrawal | G06F 21/62 |
| | | | | 713/154 |
| 8,909,734 B2 | | 12/2014 | Boss et al. | |
| 8,954,574 B1 | * | 2/2015 | Chheda | G06Q 20/085 |
| | | | | 709/220 |
| 9,612,769 B1 | * | 4/2017 | Thangapalam | G06F 3/065 |
| 2013/0205007 A1 | | 8/2013 | Ayachitula et al. | |
| 2014/0122577 A1 | | 5/2014 | Balasubramanian | |
| 2015/0127607 A1 | * | 5/2015 | Savage | G06F 17/30194 |
| | | | | 707/610 |

OTHER PUBLICATIONS

"Cloudward Bound: Planning for Beneficial Migration of Enterprise Applications to the Cloud", Hajjat et al., 2010. (Year: 2010).*

(Continued)

*Primary Examiner* — Tonia L Dollinger
*Assistant Examiner* — Jonathan A Sparks
(74) *Attorney, Agent, or Firm* — Zilka-Kotab, P.C.

(57) ABSTRACT

A computer-implemented method is provided for predicting cloud enablement from storage and data metrics harnessed from across stack. The computer-implemented method includes identifying a corpus of data to be classified, and configuring at least one access threshold and at least one sensitivity threshold. The computer-implemented method also includes classifying at least a portion the data within the corpus based on the at least one access threshold and the at least one sensitivity threshold. Finally, the computer-implemented method includes outputting a model, based on the classification, that identifies at least a portion of the data for migration for enabling a hybrid cloud environment.

20 Claims, 5 Drawing Sheets

(56) References Cited

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.

* cited by examiner

PREDICTING CLOUD ENABLEMENT FROM STORAGE AND DATA METRICS HARNESSED FROM ACROSS STACK

BACKGROUND

The present invention relates to cloud storage, and more specifically, this invention relates to using stack metrics to identify data for cloud migration.

Data may be classified by organizing the data into categories based on sensitivity, value, and criticality to an enterprise. Similarly, storage tiering is the process of identification, progression, and demotion of data across storage tiers based on cost and performance criticality to the enterprise. For example, relatively active data may be allocated to high performance storage, and relatively inactive data may be allocated to lower cost storage.

While exponential data growth has resulted in the wide adoption of cloud storage when it aligns with cost, agility, and return-on-investment goals, security, regulatory compliance, control, and enterprise-level objectives remain as roadblocks preventing the adoption of cloud computing by some entities. Additionally, much of the analysis with respect to storage and data are done in independent silos, making it difficult to identify data sets and applications that are ideal for movement to the cloud.

SUMMARY

In one general embodiment, a computer-implemented method is provided for predicting cloud enablement from storage and data metrics harnessed from across stack. The computer-implemented method includes identifying a corpus of data to be classified, and configuring at least one access threshold and at least one sensitivity threshold. The computer-implemented method also includes classifying at least a portion the data within the corpus based on the at least one access threshold and the at least one sensitivity threshold. Finally, the computer-implemented method includes outputting a model, based on the classification, that identifies at least a portion of the data for migration for enabling a hybrid cloud environment.

In another general embodiment, a computer program product is provided for predicting cloud enablement from storage and data metrics. The computer program product comprises a computer readable storage medium having program instructions embodied therewith. The program instructions are executable by a processor to cause the processor to identify a corpus of data to be classified, and to configure at least one access threshold and at least one sensitivity threshold. Additionally, the program instructions are executable by the processor to cause the processor to classify at least a portion the data within the corpus based on the at least one access threshold and the at least one sensitivity threshold. Moreover, the program instructions are executable by the processor to cause the processor to output a model, based on the classification, that identifies at least a portion of the data for migration for enabling a hybrid cloud environment.

In another general embodiment, a system is provided for predicting cloud enablement from storage and data metrics. The system includes a processor and logic integrated with and/or executable by the processor. The logic is configured to identify a corpus of data to be classified, and to configure at least one access threshold and at least one sensitivity threshold. Also, the logic is configured to classify at least a portion the data within the corpus based on the at least one access threshold and the at least one sensitivity threshold. Still yet, the logic is configured to output a model, based on the classification, that identifies at least a portion of the data for migration for enabling a hybrid cloud environment.

Other aspects and embodiments of the present invention will become apparent from the following detailed description, which, when taken in conjunction with the drawings, illustrate by way of example the principles of the invention.

DETAILED DESCRIPTION

Figure 1:
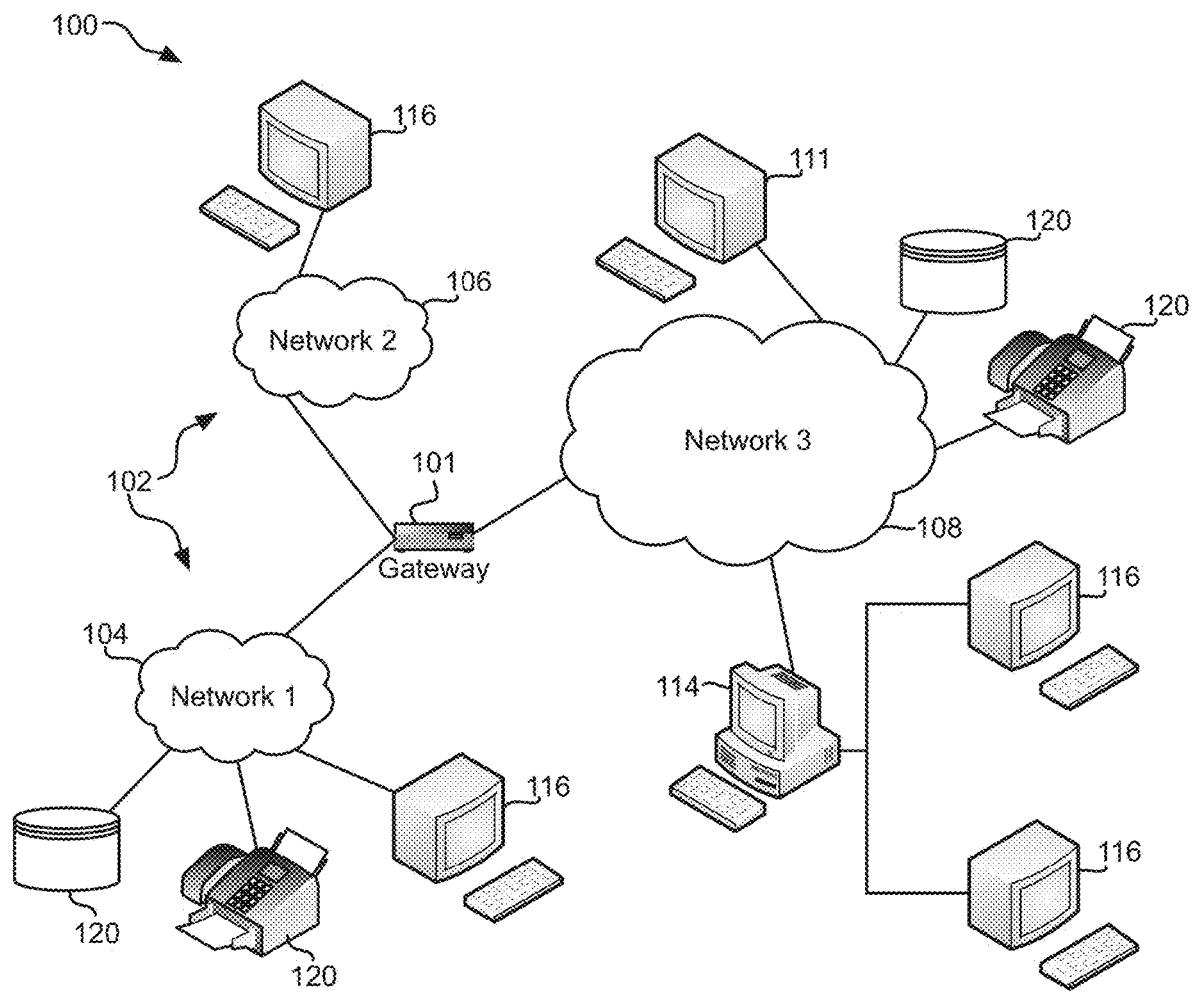
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for predicting cloud enablement from storage and data metrics that are harnessed across a stack.

In one general embodiment, a computer-implemented method is provided for predicting cloud enablement from storage and data metrics harnessed from across stack. The computer-implemented method includes identifying a corpus of data to be classified, and configuring at least one access threshold and at least one sensitivity threshold. The computer-implemented method also includes classifying at least a portion the data within the corpus based on the at least one access threshold and the at least one sensitivity threshold. Finally, the computer-implemented method includes outputting a model, based on the classification, that identifies at least a portion of the data for migration for enabling a hybrid cloud environment.

In another general embodiment, a computer program product is provided for predicting cloud enablement from storage and data metrics. The computer program product comprises a computer readable storage medium having program instructions embodied therewith. The program instructions are executable by a processor to cause the processor to identify a corpus of data to be classified, and to configure at least one access threshold and at least one sensitivity threshold. Additionally, the program instructions are executable by the processor to cause the processor to classify at least a portion the data within the corpus based on the at least one access threshold and the at least one sensitivity threshold. Moreover, the program instructions are executable by the processor to cause the processor to output a model, based on the classification, that identifies at least a portion of the data for migration for enabling a hybrid cloud environment.

In another general embodiment, a system is provided for predicting cloud enablement from storage and data metrics. The system includes a processor and logic integrated with and/or executable by the processor. The logic is configured to identify a corpus of data to be classified, and to configure at least one access threshold and at least one sensitivity threshold. Also, the logic is configured to classify at least a portion the data within the corpus based on the at least one access threshold and the at least one sensitivity threshold. Still yet, the logic is configured to output a model, based on the classification, that identifies at least a portion of the data for migration for enabling a hybrid cloud environment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
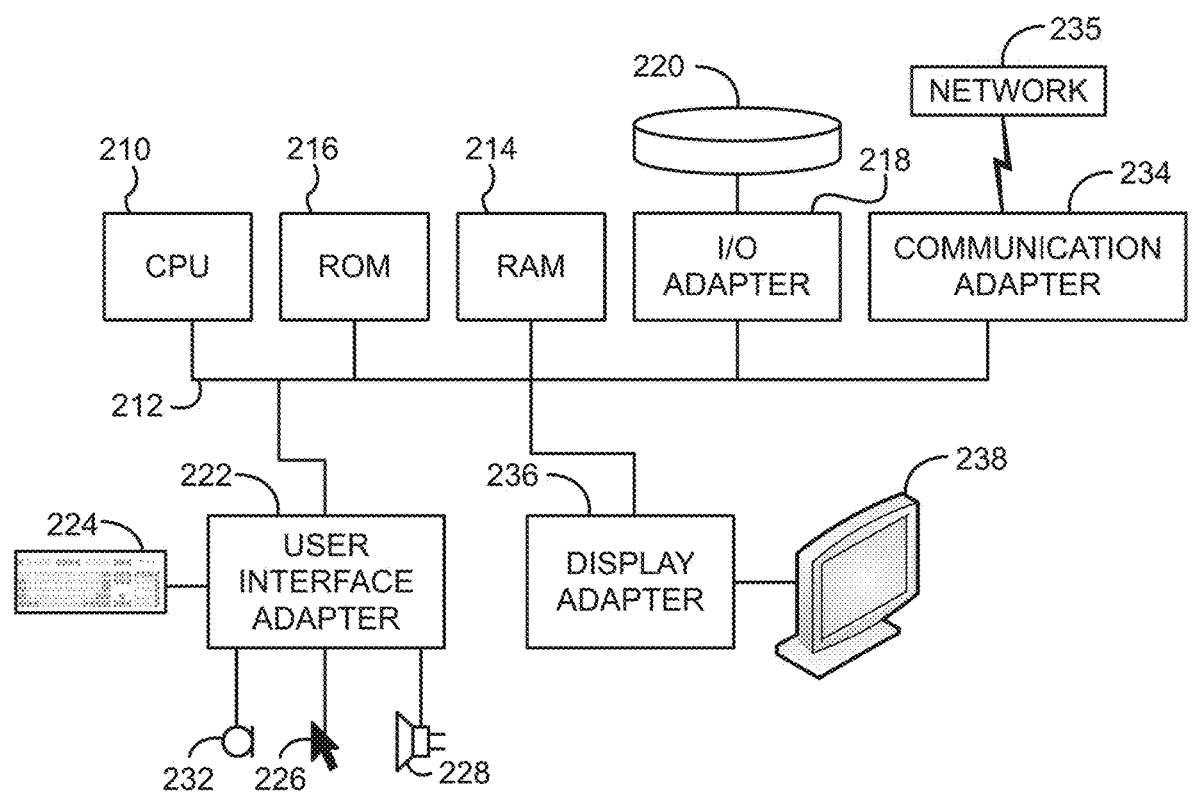
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
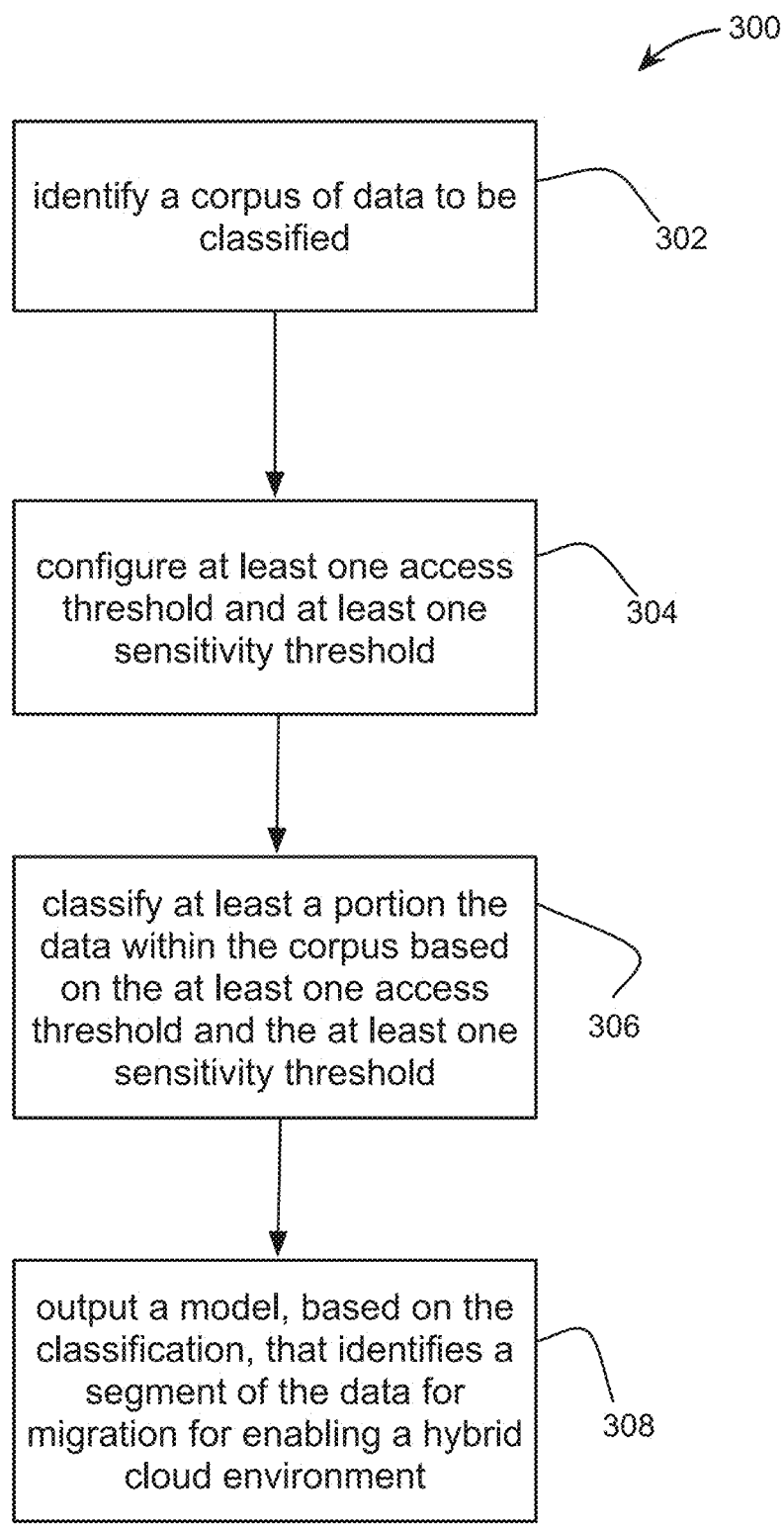
FIG. 3 illustrates a method for predicting cloud enablement from storage and data metrics, in accordance with an embodiment of the invention.

Now referring to FIG. 3, a flowchart of a method 300 for predicting cloud enablement from storage and data metrics is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 initiates with operation 302, where a corpus of data to be classified is identified. As used herein the corpus of data includes any collection of information that is stored electronically. For example, the corpus of data may comprise files or objects stored on magnetic media (e.g., hard disk drives, tape media, etc.), optical media (e.g., CD-ROM, DVD-ROM, etc.), non-volatile media (e.g., flash memory, solid state drives, etc.), etc. The data may include system data, application data, user data, etc.

Moreover, the corpus of data may be identified in any practicable manner. For example, in one embodiment, the data may be identified by a user selecting the data for classification. In another embodiment, the data may be automatically identified based on parameters or attributes that have been previously defined, such as, for example, by a user.

Next, at operation 304, at least one access threshold and at least one sensitivity threshold are configured. The access threshold may be configured and measured with respect to any unit of data that comprises the data in the identified corpus. In other words, the access threshold may be configured with respect to one or more applications, files, folders, volumes, disks, objects, etc. As used herein, an access threshold includes any value, such as a minimum value or maximum value, that is utilized to indicate the absence or occurrence of a data access condition.

In one embodiment, the access threshold may include a value representative of I/O density. For example, the access threshold may include an access rate threshold in units of IO/GB/sec, or a number of I/O operations performed per stored gigabyte (GB) per second. In such an example, if an access rate for a unit of data is measured (in IO/GB/sec) to be greater than the access threshold, then the access rate has exceeded the access threshold.

For purposes of brevity, when the access rate of a unit of data is measured to exceed the access threshold, then the unit of data may be herein referred to as being "hot." Conversely, when the access rate of a unit of data is measured to be below the access threshold, then the unit of data may be herein referred to as being "cold." Whether the unit of data is classified as hot or cold when the access rate of a unit of data is measured to be equal to the access threshold may depend on a configuration of the given implementation.

As another example, the access threshold may include a response time threshold that is measured in units of time (e.g., seconds, milliseconds, etc.). In such an example, if a response time for accessing a unit of data is measured to be greater than the access threshold, then the access time or response has exceeded the access threshold.

When a response time for accessing a unit of data is less than a threshold response time, then the unit of data may be herein referred to as being "hot." Conversely, when the response time for accessing the unit of data is greater than the threshold response time, then the unit of data may be herein referred to as being "cold." Whether the unit of data is classified as hot or cold when the response time for accessing the unit of data is measured to be equal to the access threshold may depend on a configuration of the given implementation.

In some embodiments, a particular access threshold may be configured such that certain data is determined hot when compared to the access threshold. For example, the access threshold may be configured such that a particular financial application, financial transaction records, e-commerce application, and/or e-commerce records, are accessed in excess of the access threshold and therefore classified as hot. Other examples of data include volumes, business-processing applications and records, data analysis applications and records, documents, emails, backed-up data, archived data, etc. Accordingly the access threshold may be configured such that some portion of the aforementioned data is determined hot, and another portion of the data is determined cold.

Further, each sensitivity threshold may be configured and measured with respect to any unit of data that comprises the data in the identified corpus. In other words, the sensitivity threshold may be configured with respect to one or more applications, files, folders, volumes, disks, objects, etc. As used herein, a sensitivity threshold includes any value, such as a minimum value or maximum value, that is utilized to indicate the absence or occurrence of a data sensitivity condition.

In one embodiment, a sensitivity threshold may include a value representative of data sensitivity. Data sensitivity for a unit of data may be determined based on the contents of the unit of data, metadata of the unit of data, a storage location of the unit of data, etc., as described in more detail below.

In some embodiments, a particular sensitivity threshold may be configured such that certain data is determined sensitive or not sensitive when compared to the sensitivity threshold, as described in more detail below. For example, the sensitivity threshold may be configured such that a particular financial application, financial transaction records, e-commerce application, and/or e-commerce records, are classified as sensitive. Still yet, the sensitivity threshold may be configured such that one or more volumes, business-processing applications and records, data analysis applications and records, documents, emails, backed-up data, archived data, etc. are classified as sensitive or not sensitive.

Configuring the thresholds includes any action that defines the thresholds with respect to one or more values. For example, in one embodiment, the thresholds may be explicitly or implicitly defined by a user via a user interface, such as the user interface of a web-based application.

Additionally, at operation 306, at least a portion of the data within the corpus is classified based on the at least one access threshold and the at least one sensitivity threshold. In one embodiment, a portion of the data is classified by comparing the portion of data to an access threshold and a sensitivity threshold configured at operation 304. For example, each unit of data within the portion of the data may be compared to an access threshold and a sensitivity threshold configured at operation 304.

In one embodiment, where one or more sensitivity thresholds have been configured, then a unit of data may be compared to the sensitivity thresholds. Further, based on the comparison, the unit of data may be classified as either sensitive or not sensitive. In another embodiment, where one or m ore sensitivity thresholds have been configured, then a unit of data may be classified as one of sensitive, not sensitive, or unknown, based on the comparison of the unit of data to one or more sensitivity thresholds.

In accordance with the configuration of any sensitivity thresholds, sensitive data may include business critical data, confidential data, data designated for internal use, and/or restricted-access data. Additionally, not sensitive data may include business non-critical data, non-confidential data, and/or data that is already publicly accessible. Moreover, unknown data may include data that is not classifiable as either sensitive data or not sensitive data. Unknown data may be determined as not classifiable due to an inability to determine characteristics or attributes of the data, or because the data does not clearly fall within the designations of sensitive or not sensitive, as defined by any sensitivity thresholds. For example, if data contents are structured in a proprietary manner that cannot be read or crawled by non-proprietary software, then the data may be classified as unknown.

Various characteristics or attributes of a unit of data may be utilized for classifying the unit of data relative to a sensitivity threshold. In one embodiment, one or more of a content of the unit of data, and metadata of the unit of data may be utilized.

The content of a unit of data may include any substantive information within the unit of data. For example, if a given file is determined to include a social security number, a credit card number, medical information, etc., then the unit of data may be classified as sensitive. Accordingly, in such an example, one or more sensitivity thresholds may be configured to classify a file as sensitive if it contains a social security number, a credit card number, or medical information.

The metadata of a unit of data may include a name (e.g., filename, etc.), a type (e.g., a filetype, etc.), a creation date, a size, an extension, a creator, a last modified date, an owner, a file spread, etc. Accordingly, as one example, a file may be classified as sensitive based on its filename and its owner. In such an example, one or more sensitivity thresholds may be configured to classify a file as sensitive based on filename strings and file ownership.

During classification, each unit of data compared to a sensitivity threshold may also be compared to an access threshold to determine whether the unit of data is hot or cold, as described above. Accordingly, each unit of data within the classified portion of data may be classified as either hot or cold based on one or more access thresholds, and as one of sensitive, not sensitive, or unknown based on one or more sensitivity thresholds.

In the various embodiments, any sensitivity or access threshold may be customized or configured based on a domain of the data to which the thresholds are being applied. For example, in the context of a first environment, wherein thousands of transactions are committed on an hourly basis, a unit of data that is accessed bi-weekly may be considered cold. However, in the context of a second environment, wherein payroll data is stored and tracked, a unit of data that is accessed bi-weekly may be considered hot. Accordingly, any access thresholds configured for application to data of the first environment would likely be unsuitable for application to data of the second environment. As another example, a sensitivity threshold may be configured such that all email sent from a C-level executive of a corporation is determined sensitive when the email is addressed to certain co-workers or employees of the corporation, however is determined to be not sensitive when the email is addressed to a public governmental agency.

Accordingly, by adjusting an access threshold, control may be provided to define what is considered cold data and what is considered hot data. In one embodiment, where an access threshold includes an access rate value representative of I/O density, the access threshold may vary from 0 to 1. In such an embodiment, for example, the threshold may be configured such that any data with an access rate below 0.3 I/O operations per GB/sec is cold, and any data with a value above 0.3 I/O operations per GB/sec is hot. If it is determined, using the threshold of 0.3, that not enough data is being identified as cold, then the threshold may be increased. For example, the access threshold may be increased to 0.5, such that any data with a value below 0.5 I/O operations per GB/sec is cold, and any data with a value above 0.5 I/O operations per GB/sec is hot.

In one embodiment, all data within a given volume may be attributed as having an access rate or response time determined for the volume on which the data is stored. In other words, rather that determining an access rate for each file, object, directory, etc. of a volume, an access rate or response time is determined the volume, and the determined access rate or response time is attributed to the data stored on the volume. Accordingly, all data on a given volume may be classified as either hot or cold, depending on an access threshold that is used for the classification. In this manner, entire volumes may be identified for cloud migration, as described in more detail below.

Data sensitivity information and data access information for the corpus of data may be obtained from a plurality sources. In one embodiment, sensitivity information and access information for the data may be obtained from one or more of an application stack, a data stack, and an infrastructure stack. An application stack may provide application-related information regarding the data, such as types of applications comprising the data, and servers running the applications, etc. For example, an application stack may provide that, in a given environment comprising 35 servers, 20 of the servers are email servers, 10 of the servers are used to for file storage, and 5 of the servers are used for website hosting.

A data stack may provide metadata of the data, as well as contents of the data.

Finally, an infrastructure stack may provide performance metrics information relating to use of the data. The performance metrics information may include, for example, an access rate of the data (e.g., a read I/O rate, a write I/O rate, etc.) and/or a response time for the data (e.g., a read response time, a write response time, etc.). In this manner, information utilized for classifying the data may be harnessed from across an application stack, a data stack, and/or an infrastructure stack.

Stack information may be obtained using one or more record management, electronic discovery, compliance, storage optimization, data migration, storage tiering, or application discovery tool. By way of specific example, the stack information may be obtained using one or more of IBM StoredIQ, EasyTier, IBM Spectrum Virtualize (e.g., SVC, v7000, etc.), and IBM Tivoli Dependency Discovery Manager.

In one embodiment, the at least a portion of the data may include all of the data in the corpus of data. In such an embodiment, then, all files within the corpus of data may be classified.

In another embodiment, only a portion of the data in the corpus may be classified, and a result of the classification is extrapolated to predict a makeup of a remainder of the data that is not classified.

For example, although 100% of the application stack, and 100% of the performance metrics from the infrastructure stack may be identified, the data stack may not be fully available for analysis. In other words, although the types of applications comprising the data, servers running the application, performance metrics relating to the data, and metadata of the data may be accessible, contents of the actual data may not be. This may be because the metadata is readily obtained and analyzed on the control plane, without interfering with the data plane of the corpus of data, and therefore identifying file metadata is quicker and less intrusive than reading file contents. Moreover, in some environments, the contents of the data may be protected by corporate or regulatory policies.

Accordingly, in such an example, a portion of the data may be selected (e.g., 10%, 20%, 25%, etc. of the data), and then the selected data may be read or crawled for determining the contents of the portion of the data. Further, the portion of the data may then be classified based on an access threshold and a sensitivity threshold, as described above.

As an option, the classification of the portion of the data may be used to predict a composition of the remainder of the corpus of the data. For example, if 20% of a corpus of data is selected, contents of the selected portion are read, and the selected portion is then classified, using the contents, based on an access threshold and a sensitivity threshold. A predictive model may then be built based on the classification of the selected portion of the data using a machine learning algorithm, such as, for example, using Support Vector Machine (SVM). The predictive model may receive as inputs information from one or more of the application stack, the data stack, and the infrastructure stack. The predictive model may then output a classification or prediction of the sensitivity of the remainder of the corpus of data (i.e., the remaining 80%). Accordingly, a composition of the data may be estimated by reading or crawling only a representative subset of the data. Additionally, in this manner, a portion of the data may be classified without first fully ascertaining one or more of the application stack, the data stack, and the infrastructure stack.

In some embodiments, data that is added to the corpus of data may be classified as the data is added. For example as a new file is created or saved to the corpus of data, the new file may be analyzed based on an application the file is associated with, metadata of the file, and/or contents of the file to determine a classification of the file with respect to an access threshold and a sensitivity threshold.

In one embodiment, any newly created data may be associated with application stack information, data stack information, and infrastructure stack information. Based on one or more of the application stack information, data stack information, and infrastructure stack information, a predictive model may classify the newly created data.

Still yet, with continued reference to FIG. 3, a model is output, at operation 308, based on the classification. Moreover, the model identifies a segment of the data for migration. Further, the migration of the data is for enabling a hybrid cloud environment.

As used herein, the migration for enabling a hybrid cloud environment, also referred to herein as a hybrid cloud migration, may include any operation that moves a segment of the data from a first cloud to a second cloud. In one embodiment, the hybrid cloud migration may include moving a segment of the data from a private cloud to a public cloud. In another embodiment, the hybrid cloud migration may include moving a segment of the data from an on-premise data center to a hybrid cloud. In yet another embodiment, the hybrid cloud migration may include moving a segment of the data from a first private cloud to a second private cloud. In other embodiments, the hybrid cloud migration may include moving a segment of the data to/from any combination of public cloud, private cloud, hybrid cloud, on-premise data storage, and off-premise data storage. Accordingly, the model may be used to strategically analyze a body of data for gaining practical insight with respect to a migration operation for at least a portion of the data.

The public cloud may include any computing resource, such as storage, applications, processing, etc. that is made available by a third-party service provider. For example, a plurality of tenants may utilize the computing resources of the third-party service provider on a free or paid basis.

In contrast, the private cloud may include a computing resource that is managed and utilized by a private organization. For example, the private cloud may include a proprietary network, private storage resources, and/or private processing resources, etc. that are managed by the organization utilizing the private cloud. The organization managing the private cloud may maintain control and visibility of business-critical applications within the private cloud.

Still yet, a hybrid cloud may provide secure, on-demand access to computing resources of a private cloud with flexibility to move workloads to a public cloud in order to meet specific needs. For example, a hybrid cloud may be utilized for development and test purposes due to the ability to provide flexibility, and gain needed capacity for limited time periods without capital investments for additional infrastructure. As another example, a hybrid cloud may allow an organization to extend existing applications to the cloud to meet the needs of rapid growth, or to free on-site resources for more business-critical projects. Still yet, a hybrid cloud can offer an affordable disaster recovery solution with flexible commitments, capacity, and cost. Even more, a hybrid cloud may be utilized for cloud-native and mobile applications that are data-intensive, and tend to require elasticity to scale with sudden or unpredictable traffic spikes.

Accordingly, by utilizing a hybrid cloud, an organization can keep sensitive data on-site and maintain existing IT policies to meet security and compliance requirements, while having the ability to scale as needed based on traffic spikes or other events and without requiring the organization to front the costs of adding capacity to its private cloud. By migrating the segment of data from the private cloud to the public cloud, an organization that controls the data may gain storage capacity, and the ability to scale services on-demand, without compromising the security of sensitive data or adversely affecting data access rates.

In some embodiments, the model may also identify one or more additional segments of the data that are not suitable for hybrid cloud migration. For example, the corpus of data identified at operation 302 may include data classified as hot and/or sensitive data that should be kept on the private cloud. The model may provide information regarding these data segments, such as size and file spread, as described in more detail below.

Figure 4A:
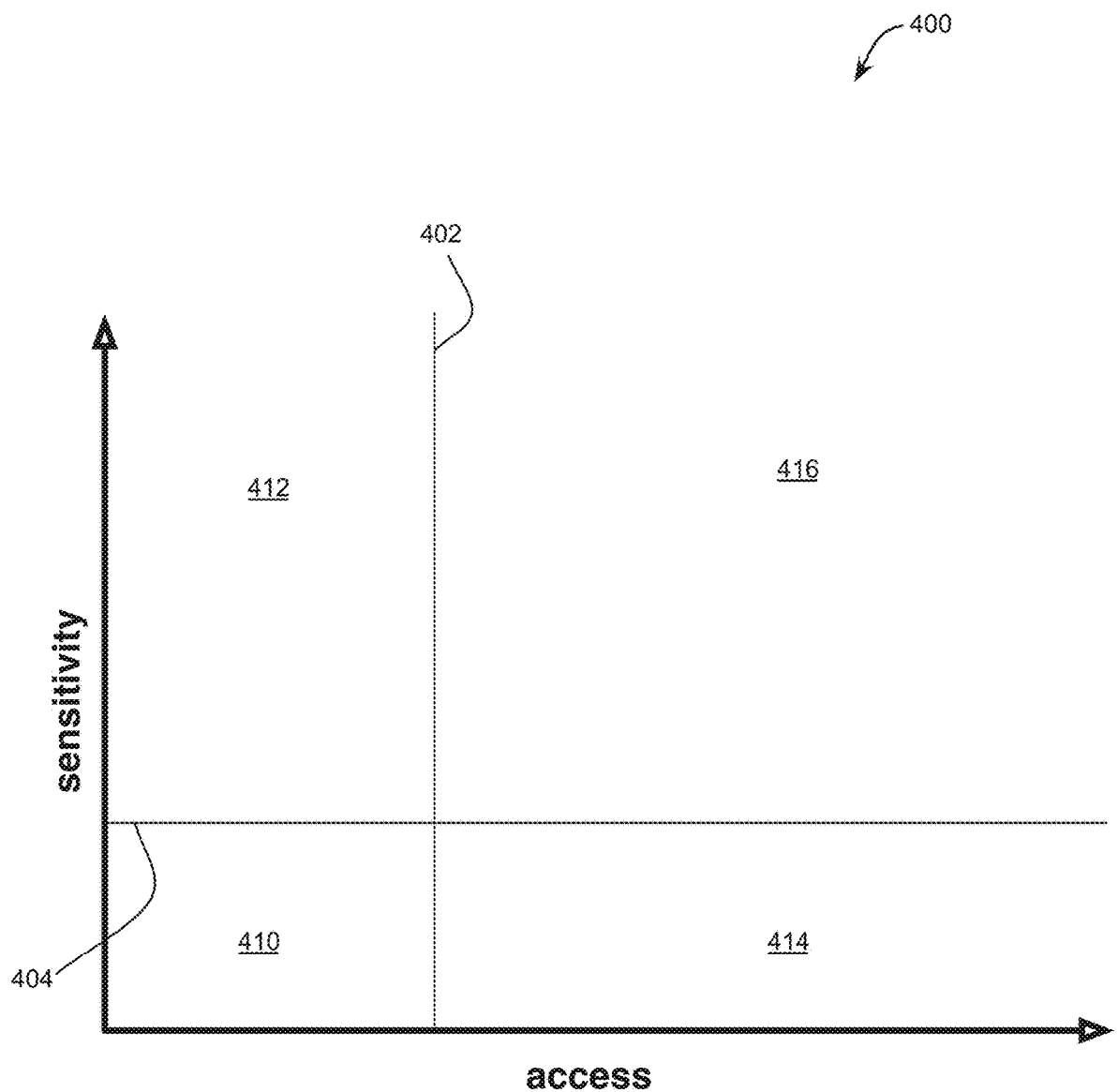
FIG. 4A illustrates a model that identifies a segment of data for migration for enablement of a hybrid cloud environment, according to one embodiment.
Figure 4B:
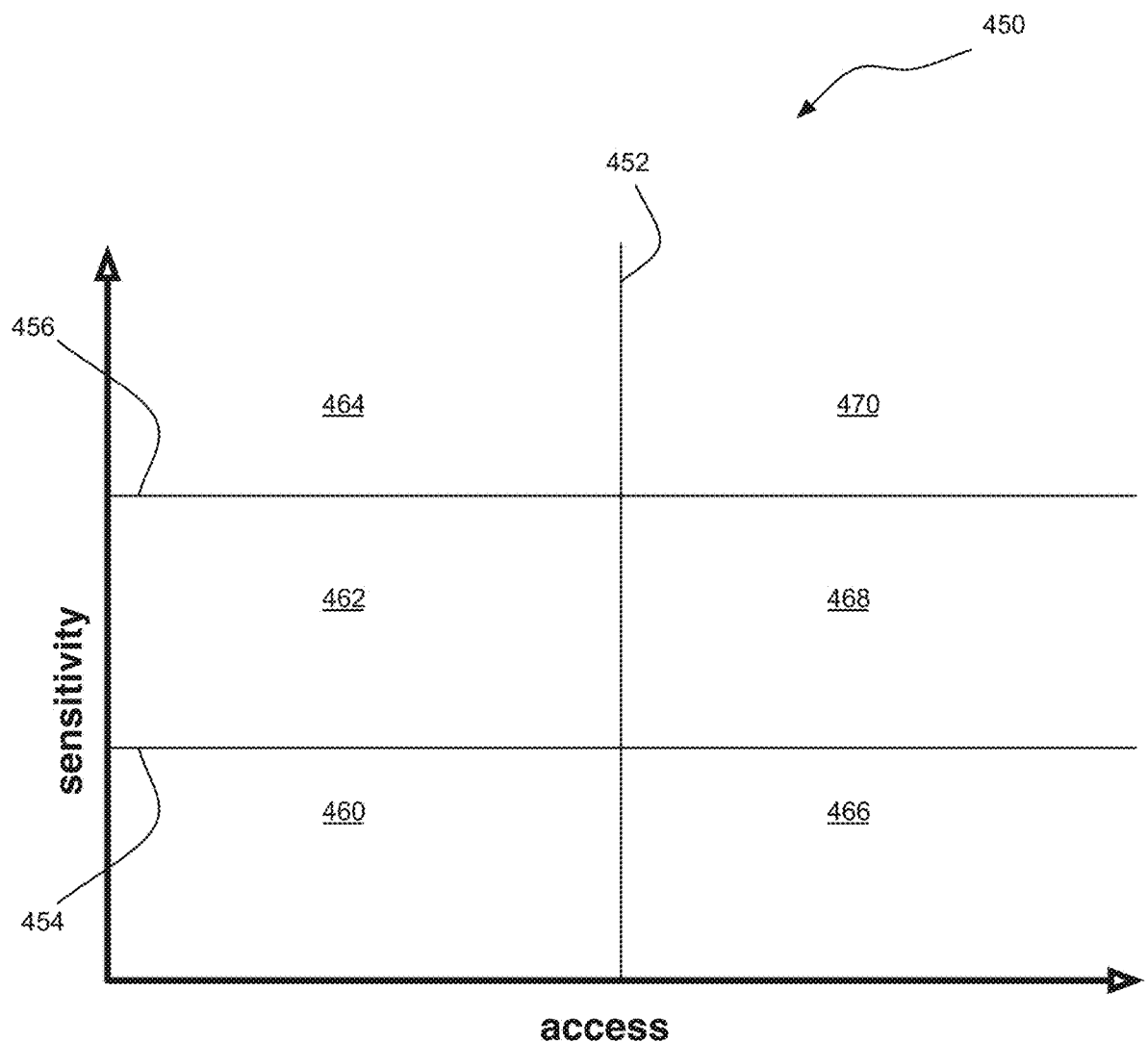
FIG. 4B illustrates a model that identifies a segment of data for migration for enablement of a hybrid cloud environment, in accordance with an embodiment.

FIGS. 4A and 4B depict models 400 and 450, respectively, where each of models 400 and 450 identify a segment of data for migration for enabling a hybrid cloud environment, in accordance with one embodiment. As an option, the models 400 and 450 may be implemented in conjunction with features from any other embodiment listed herein, such as those described with reference to the other FIGS. Of course, however, the models 400 and 450 and others presented herein may be used in various applications and/or in permutations which may or may not be specifically described in the illustrative embodiments listed herein. Further, the models 400 and 450 presented herein may be used in any desired environment.

Referring specifically to FIG. 4A, the model 400 is shown to include an access threshold 402 that is plotted as extending from an x-axis, and a sensitivity threshold 404 that is plotted as extending from a y-axis. Each of the access threshold 402 and the sensitivity threshold 404 may be previously configured thresholds, such as those described in the context of operation 304 of FIG. 3.

Additionally, by way of a classification operation, such as the one performed at operation 306 in the context of FIG. 3, a corpus of data is classified, based on the thresholds, into four data segments 410, 412, 414, and 416. For example, the data segment 410 may comprise a portion of the data that is determined to be cold and not sensitive based on a comparison of the data with the thresholds 402 and 404. Additionally, the data segment 412 may comprise a portion of the data that is determined to be cold and sensitive based on the comparison of the data with the thresholds 402 and 404. Still yet, the data segment 414 may comprise a portion of the data that is determined to be hot and not sensitive based on the comparison of the data with the thresholds 402 and 404; and the data segment 416 may comprise a portion of the data that is determined to be hot and sensitive based on the comparison of the data with the thresholds 402 and 404.

In one embodiment, based on the above segmentation, the data segment 410 comprising cold and not sensitive data may be identified for cloud migration. For example, because the data of the data segment 410 experiences access rates that are below the access threshold 402 (e.g., less than n times per interval, etc.), and the data of the data segment 410 is not sensitive data, it may be moved to a public cloud. As a result of moving the data segment 410, an organization that owns the data may gain local storage space, without a risk of adversely affecting applications or users that utilize the data, or a risk of accidental release of confidential data. In other words, because the data of the data segment 410 is not confidential and used infrequently, the benefits of relocating the data of data segment 410 to the cloud may outweigh the associated risks.

In one embodiment, for each of the segments, a percentage of the corpus of data attributed the segment may be calculated. As an option, the percentage values may be displayed to a user, such as, for example, within a model. For example, with respect to the model 400 of FIG. 4A, a user may be informed that the data segment 410 includes 8% of a corpus of data, the data segment 412 includes 24% of the corpus of data, the data segment 414 includes 16% of the corpus of data, and the data segment 416 includes 52% of the corpus of data.

In another embodiment, for each of the segments, a size of the data comprising the segment may be calculated. For example, with respect to the model 400 of FIG. 4A, a user may be informed that the data segment 410 includes 40 GB of a 500 GB corpus of data, the data segment 412 includes 120 GB of the 500 GB corpus of data, the data segment 414 includes 80 GB of the 500 GB corpus of data, and the data segment 416 includes 260 GB of the 500 GB corpus of data.

In some embodiments, one or more segments of data may be attributed with a file spread value that is calculated based on a continuity of the units of data comprising the segments. A file spread value that has been calculated for a segment may represent a confidence with respect to collocation of the segment of data. In various embodiments, file spread may be calculated using volume metadata. Further, a calculated file spread value may be displayed to a user in association with the segment for which the file spread value is calculated. In one embodiment, the file spread value may be between 0 and 1.

For example, if all of the data comprising the data segment 410 is located within a single directory on a volume, then a file spread value of 1 may be calculated for the data segment 410, thereby indicating that the data comprising the data segment 410 is strongly collocated. However, if all of the data comprising the data segment 410 is evenly spread between hundreds or thousands of directories comprising the data segment 410, then a file spread value of 0 may be calculated for the data segment 410, indicating that the data comprising the data segment 410 is dispersed throughout one or more volumes without any identifiable bias.

The file spread value of a data segment may indicate how easy or difficult it will be to locate the data of the segment. Using the examples above, if all data of the data segment 410 is located within a single directory on a volume, then the data segment 410 may migrated by simply relocating the appropriate contents of the single directory. However, if the data comprising the data segment 410 is evenly spread between hundreds or thousands of directories, then selecting and migrating individual files from each directory may be a difficult and resource-intensive task.

In one embodiment, a file spread value may be calculated for a data segment that is not being migrated, such as the sensitive hot data of the data segment 416. In such a scenario, the file spread value for the data segment 416 may be utilized to determine how feasible it is to consolidate into a single location all sensitive hot data, especially where the data of a segment may be spread amongst multiple directories, volumes, servers, etc.

Deferring now to FIG. 4B, the model 450 is shown to include an access threshold 452 that is plotted as extending from an x-axis as well as a first sensitivity threshold 454 and a second sensitivity threshold 456, each plotted as extending from a y-axis extending. Each of the access threshold 452, the first sensitivity threshold 454 and the second sensitivity threshold 456 may be previously configured thresholds, such as those described in the context of operation 304 of FIG. 3.

Additionally, by way of a classification operation, such as the one performed at operation 306 in the context of FIG. 3, a corpus of data is classified, based on the thresholds, into data segments 460, 462, 464, 466, 468, and 470.

The model 450 may be similar to the model 400, except that the model 450, due to the configuration of two data sensitivity thresholds, accommodates the classification of an additional category of data sensitivity. For example, the data segment 460 may comprise a portion of the data that is determined to be cold and not sensitive based on a comparison of the data with the thresholds 452, 454, and 456. Additionally, the data segment 462 may comprise a portion of the data that is determined to be cold and sensitive based on the comparison of the data with the thresholds 452, 454, and 456; and the data segment 464 may comprise a portion of the data that is determined to be cold with an unknown sensitivity based on the comparison of the data with the thresholds 452, 454, and 456.

Still yet, the data segment 466 may comprise a portion of the data that is determined to be hot and not sensitive based on the comparison of the data with the thresholds 452, 454, and 456. Additionally, the data segment 468 may comprise a portion of the data that is determined to be hot and sensitive based on the comparison of the data with the thresholds 452, 454, and 456; and the data segment 470 may comprise a portion of the data that is determined to be hot with an unknown sensitivity based on the comparison of the data with the thresholds 452, 454, and 456.

In one embodiment, based on the above segmentation, the data segment 460 comprising cold and not sensitive data may be identified for cloud migration. The data segment 464 comprising cold data of u known sensitivity may not be relocated to the public cloud because of the risk of moving any sensitive data. The data segment 470 comprising hot data of unknown sensitivity may not be relocated to the public cloud because of the risk of moving any sensitive data, and because moving data that is frequently accessed may result in low access times that violate organizational needs or service level agreements.

Accordingly, where a segment of an organization's data is identified as appropriate for migration from a private cloud to a public cloud, but other segments of the data are not appropriate for such migration and should kept on the private cloud, then the organization may be a candidate for employing a hybrid cloud strategy.

In the embodiments set forth above, data privacy and access performance/response time may be utilized as the primary metrics taken into account when an organization is determining whether to migrate data to a public cloud. Moreover, once such a determination has been made, these metrics may be utilized for identifying data that is appropriate for migration to the public cloud. These metrics may leverage application-related information, infrastructure-related information, disk performance information, file contents, metadata, etc. from across multiples stacks, and merge them in a meaningful manner that extracts useful information and leads to a cloud readiness decision for the organization.

Using only one of these metrics alone (i.e., data privacy or access performance/response time) may not provide the same benefits. For example, using only the disk performance information to assess cloud readiness may not provide information at a granular level because disk performance information is largely generated at a volume-level, and not at a file-level.

In addition, by adjusting the thresholds, an organization may determine major data attributes and correlations among the data attributes that are important for determining cloud readiness.

In some embodiments, migrating an organization's data from a private cloud to a public cloud may be recognized as a benefit to the organization. In particular, the benefit may be a measurement of a profit (or loss thereof) incurred due to migrating the data from the private cloud to the public cloud. Such a benefit may arise due to changing maintenance costs, and/or legal risks.

In one embodiment, the organization may assign a profit value that can be incurred for each GB of data migrated to the public cloud, and a loss value for each sensitive file that is migrated to the public cloud.

In another embodiment, the benefit may be calculated by assigning a profit/loss value to each segment of data. For example, if an organization maintains 1000 GB of cold data with a profit/loss value of 0.8 per 1 GB, 400 GB of sensitive data with a profit/loss value of −0.7 per 1 GB, and 200 GB of hot data with a profit/loss value of −0.2 per 1 GB, then the benefit per volume may be computed as:

$$B=0.8*1000+(-0.2)*200+\ldots+(-0.7)*400.$$

In yet another embodiment, wherein entire volumes are migrated from a private cloud to a hybrid cloud solution, constraints may be imposed on such migration. For example, an organization may require that a volume is only migrated to the public cloud when a size of hot data and/or sensitive data on the volume is less than some percentage. For example, a volume may only be migrated to the public cloud when less than a first percentage (e.g., <1%, 5%, 10%, etc.) of the entire volume is hot data, and less than a second percentage (e.g., 2%, 3%, 5%, 10%, etc.) of the entire volume is sensitive data.

In some embodiments, by incrementally adjusting sensitivity and access thresholds, an organization may identify a balance between on-premise private cloud utilization and off-premise public cloud utilization. Still yet, in some embodiments, sensitivity and access thresholds may be adjusted to reach a target data migration or hybrid cloud solution. For example, using a provided data migration target, such as x % of the data or n bytes of the data, one or more of the sensitivity and access thresholds may be automatically determined to reach the provided data migration target. In addition, if the automatically determined sensitivity and access thresholds prove to be poor thresholds for the data (i.e., sensitive data is selected for migration, or hot data is selected for migration, etc.), then the automatically determined sensitivity and access thresholds may be further adjusted to better suit the organization's data, and prevent the otherwise undesirable, and possibly harmful, migration of hot or sensitive data. In other words, the automatically determined sensitivity and access thresholds may be adjusted to maximize the benefit, and minimize the risk, of migrating data to the public cloud.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or, executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or emote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a corpus of data located on a private cloud computing resource;
classifying a portion of the corpus of data based on an access threshold and a sensitivity threshold, including:
comparing an access rate for each unit of data to the access threshold, where the access threshold includes an access rate threshold, and where for each unit of the data, the unit of data is classified as hot in response to determining that the access rate for the unit of data exceeds the access threshold, and the unit of data is classified as cold in response to determining that the access rate for the unit of data does not exceed the access threshold,
comparing content of each unit of data and metadata of each unit of data to the sensitivity threshold, where the sensitivity threshold includes an indication of predetermined types of content and predetermined metadata, and where for each unit of the data, the unit of data is classified as sensitive in response to determining that the content of the unit of data and the metadata of the unit of data includes one or more of the predetermined types of content and the predetermined metadata, and the unit of data is classified as not sensitive in response to determining that the content of the unit of data and the metadata of the unit of data does not include one or more of the predetermined types of content or the predetermined metadata;

identifying a segment of the portion of the corpus of data that contains all units of data within the portion of the corpus of data that area classified as cold and not sensitive; and migrating the segment of the portion of the corpus of data from the private cloud computing resource to a public cloud computing resource.

2. The computer-implemented method of claim 1, wherein the private cloud computing resource includes a proprietary network, private storage resources, and private processing resources that are managed by an organization utilizing the private cloud.

3. The computer-implemented method of claim 1, wherein the public cloud computing resource includes storage, applications, and processing that is made available by a third-party service provider.

4. The computer-implemented method of claim 1, wherein the access rate and the access rate threshold are measured in units of I/O operations performed per stored gigabyte per second.

5. The computer-implemented method of claim 1, wherein the predetermined types of content include a social security number, a credit card number, and medical information.

6. The computer-implemented method of claim 1, wherein the predetermined metadata includes one or more predetermined filenames, one or more predetermined creation dates, one or more creators of the unit of data, and one or more owners of the unit of data.

7. The computer-implemented method of claim 1, wherein the predetermined metadata includes one or more sizes of the unit of data, one or more extensions of the unit of data, and one or more last modified dates of the unit of data.

8. The computer-implemented method of claim 1, further comprising:

determining a first percentage of the portion of the corpus of data that include items of data classified as hot;

determining a second percentage of the portion of the corpus of data that include items of data classified as sensitive; and migrating the portion of the corpus of data from the private cloud computing resource to the public cloud computing resource in response to determining that the first percentage is less than a first predetermined percentage, and determining that the second percentage is less than a second predetermined percentage.

9. A computer program product for predicting cloud enablement from storage and data metrics, the computer program product comprising a computer readable storage medium having program instructions embodied therewith, the program instructions executable by a processor to cause the processor to:

identify, by the processor, a corpus of data located on a private cloud computing resource;

classify, by the processor, a portion of the corpus of data based on an access threshold and a sensitivity threshold, including:

comparing an access rate for each unit of data to the access threshold, where the access threshold includes an access rate threshold, and where for each unit of the data, the unit of data is classified as hot in response to determining that the access rate for the unit of data exceeds the access threshold, and the unit of data is classified as cold in response to determining that the access rate for the unit of data does not exceed the access threshold, comparing content of each unit of data and metadata of each unit of data to the sensitivity threshold, where the sensitivity threshold includes an indication of predetermined types of content and predetermined metadata, and where for each unit of the data, the unit of data is classified as sensitive in response to determining that the content of the unit of data and the metadata of the unit of data includes one or more of the predetermined types of content and the predetermined metadata, and the unit of data is classified as not sensitive in response to determining that the content of the unit of data and the metadata of the unit of data does not include one or more of the predetermined types of content or the predetermined metadata;

identify, by the processor, a segment of the portion of the corpus of data that contains all units of data within the portion of the corpus of data that area classified as cold and not sensitive; and migrate, by the processor, the segment of the portion of the corpus of data from the private cloud computing resource to a public cloud computing resource.

10. The computer program product of claim 9, wherein the private cloud computing resource includes a proprietary network, private storage resources, and private processing resources that are managed by an organization utilizing the private cloud.

11. The computer program product of claim 9, wherein the public cloud computing resource includes storage, applications, and processing that is made available by a third-party service provider.

12. The computer program product of claim 9, wherein the access rate and the access rate threshold are measured in units of I/O operations performed per stored gigabyte per second.

13. The computer program product of claim 9, wherein the predetermined types of content include a social security number, a credit card number, and medical information.

14. The computer program product of claim 9, wherein the predetermined metadata includes one or more predetermined filenames, one or more predetermined creation dates, one or more creators of the unit of data, and one or more owners of the unit of data.

15. The computer program product of claim 9, wherein the predetermined metadata includes one or more sizes of the unit of data, one or more extensions of the unit of data, and one or more last modified dates of the unit of data.

16. The computer program product of claim 14, wherein the program instructions are further executable by the processor to cause the processor to:

determine, by the processor, a first percentage of the portion of the corpus of data that include items of data classified as hot;

determine, by the processor, a second percentage of the portion of the corpus of data that include items of data classified as sensitive; and migrate, by the processor, the portion of the corpus of data from the private cloud computing resource to the public cloud computing resource in response to determining that the first percentage is less than a first predetermined percentage, and determining that the second percentage is less than a second predetermined percentage.

17. A system, comprising:

a processor; and logic integrated with the processor, executable by the processor, or integrated with and executable by the processor, the logic being configured to:

identify a corpus of data located on a private cloud computing resource;

classify a portion of the corpus of data based on an access threshold and a sensitivity threshold, including:

comparing an access rate for each unit of data to the access threshold, where the access threshold includes an access rate threshold, and where for each unit of the data, the unit of data is classified as hot in response to determining that the access rate for the unit of data exceeds the access threshold, and the unit of data is classified as cold in response to determining that the access rate for the unit of data does not exceed the access threshold, comparing content of each unit of data and metadata of each unit of data to the sensitivity threshold, where the sensitivity threshold includes an indication of predetermined types of content and predetermined metadata, and where for each unit of the data, the unit of data is classified as sensitive in response to determining that the content of the unit of data and the metadata of the unit of data includes one or more of the predetermined types of content and the predetermined metadata, and the unit of data is classified as not sensitive in response to determining that the content of the unit of data and the metadata of the unit of data does not include one or more of the predetermined types of content or the predetermined metadata;

identify a segment of the portion of the corpus of data that contains all units of data within the portion of the corpus of data that area classified as cold and not sensitive; and migrate the segment of the portion of the corpus of data from the private cloud computing resource to a public cloud computing resource.

18. The system of claim 17, wherein the private cloud computing resource includes a proprietary network, private storage resources, and private processing resources that are managed by an organization utilizing the private cloud.

19. The system of claim 17, wherein the public cloud computing resource includes storage, applications, and processing that is made available by a third-party service provider.

20. The system of claim 17, wherein the access rate and the access rate threshold are measured in units of I/O operations performed per stored gigabyte per second.

* * * * *